United States Patent
Cooley

[19]

[11] Patent Number: 5,888,039
[45] Date of Patent: Mar. 30, 1999

[54] CARGO SECURING SYSTEM

[76] Inventor: Alan Jack Cooley, 10222 Deer Creek Dr., Ada, Mich. 49301

[21] Appl. No.: 985,914

[22] Filed: Dec. 5, 1997

[51] Int. Cl.$^6$ ...................................................... B60P 7/08
[52] U.S. Cl. ................................ 410/50; 410/36; 410/42; 410/49; 410/91; 410/97
[58] Field of Search .................................. 410/30, 47, 50, 410/49, 97, 90, 91, 36, 42; 248/499; 206/389, 446; 211/13.1; 188/32

[56] References Cited

U.S. PATENT DOCUMENTS

| D. 316,243 | 4/1991 | Henry ...................................... D12/217 |
| 2,991,734 | 7/1961 | Gabriel ........................................ 410/49 |
| 3,637,234 | 1/1972 | Thomas et al. ............................ 410/50 |
| 3,807,759 | 4/1974 | Vornberger ................................ 410/50 |
| 3,972,500 | 8/1976 | Johnson et al. ............................ 410/85 |
| 4,190,165 | 2/1980 | Collins ..................................... 211/60.1 |
| 4,729,537 | 3/1988 | Turner et al. ......................... 410/36 X |
| 5,037,255 | 8/1991 | Bullock et al. ............................ 410/30 |
| 5,193,700 | 3/1993 | Lyman et al. ............................. 220/1.5 |
| 5,193,955 | 3/1993 | Chou ........................................ 410/100 |
| 5,423,644 | 6/1995 | First, Sr. .................................. 410/100 |
| 5,425,608 | 6/1995 | Reitnouer .................................. 410/49 |
| 5,476,348 | 12/1995 | Shelleby .................................... 410/49 |

FOREIGN PATENT DOCUMENTS 128364  1/1960  U.S.S.R. ................................ 248/499

*Primary Examiner*—Stephen T. Gordon

[57] ABSTRACT

A cargo securing system including at least one elongated block portion having a plurality of studs extending downwardly therefrom for coupling with through holes in a trailer. A plurality of pipe attachment portions are provided with each having a recess extending within a lower surface thereof. The recess is dimensioned for coupling with the block portion. A pipe harness is provided comprising a pair of elongated straps, a pair of short cross straps and crisscrossing central straps. The short cross straps have free ends with buckles disposed thereon. An extension strap is adapted for coupling with free ends of the elongated straps of the pipe harness. The extension strap has a clip on a free end thereof for engaging existing securement buckles on the trailer. A coupling strap is provided having clips disposed on opposing free ends thereof. The coupling strap couples with the buckles of the short cross straps and the existing securement buckles of the trailer.

3 Claims, 3 Drawing Sheets

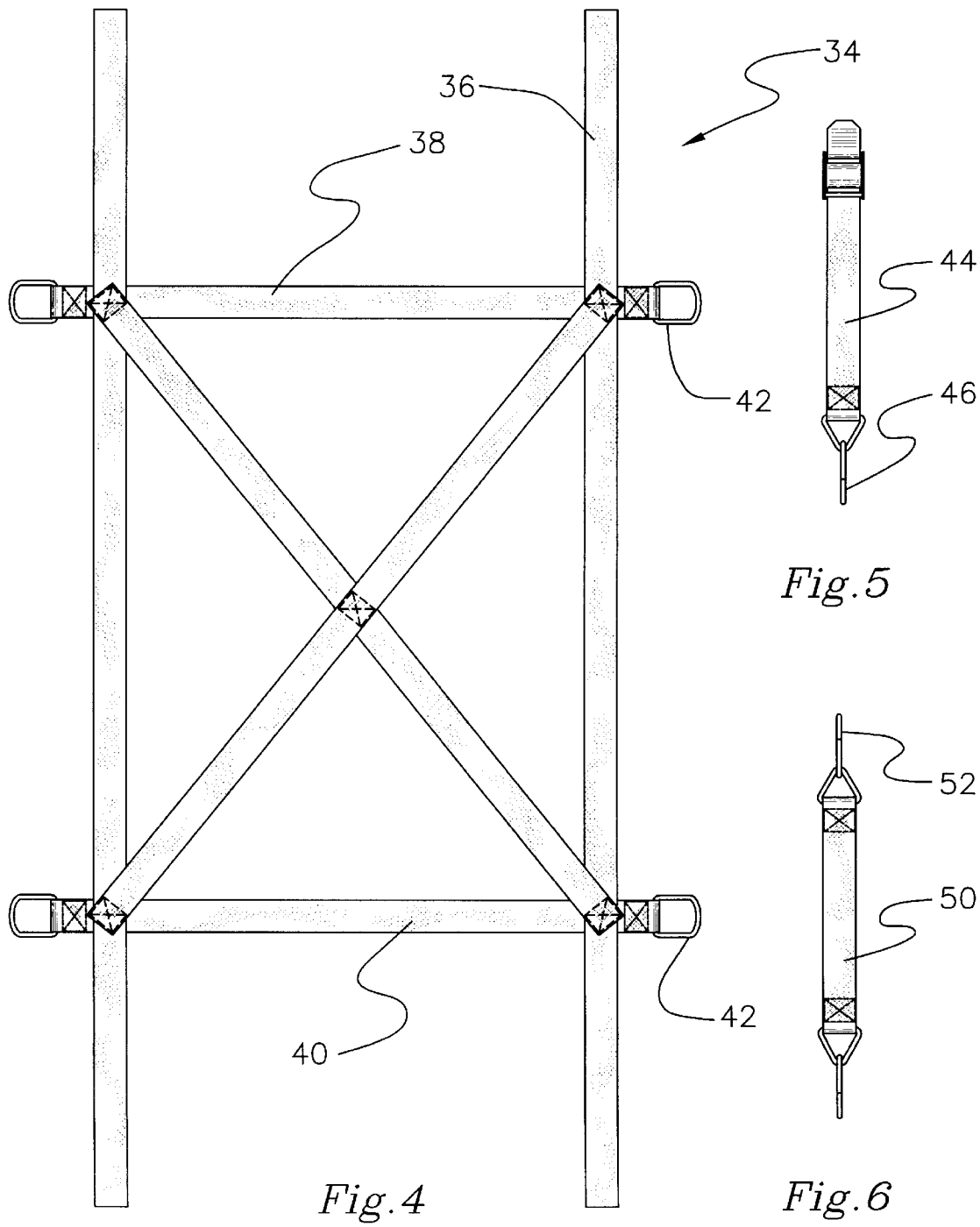

CARGO SECURING SYSTEM

BACKGROUND OF THE INVENTION

1. Field of the Invention

The present invention relates to a cargo securing system and more particularly pertains to preventing cargo from sliding while being transported on a trailer with a cargo securing system.

2. Description of the Prior Art

The use of cargo containment devices is known in the prior art. More specifically, cargo containment devices heretofore devised and utilized for the purpose of containing cargo are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,425,608 to Reitnouer; U.S. Pat. No. 5,193,700 to Lyman et al.; U.S. Pat. No. Des. 316,243 to Henry; U.S. Pat. No. 4,190,165 to Collins; U.S. Pat. No. 5,423,644 to First, Sr.; and U.S. Pat. No. 3,972,500 to Johnson et al.

While these devices fulfill their respective, particular objective and requirements, the aforementioned patents do not describe a cargo securing system for preventing Cargo from sliding while being transported on a trailer.

In this respect, the cargo securing system according to the present invention substantially departs from the conventional concepts and designs of the prior art, and in doing so provides an apparatus primarily developed for the purpose of preventing Cargo from sliding while being transported on a trailer.

Therefore, it can be appreciated that there exists a continuing need for new and improved cargo securing system which can be used for preventing Cargo from sliding while being transported on a trailer. In this regard, the present invention substantially fulfills this need.

SUMMARY OF THE INVENTION

In the view of the foregoing disadvantages inherent in the known types of cargo containment devices now present in the prior art, the present invention provides an improved cargo securing system. As such, the general purpose of the present invention, which will be described subsequently in greater detail, is to provide a new and improved cargo securing system and method which has all the advantages of the prior art and none of the disadvantages.

To attain this, the present invention essentially comprises at least one elongated block portion having a trapezoidal cross-section. The block portion has a wide lower end, a narrow upper end and opposed angled side walls. The wide lower end has a plurality of studs extending downwardly therefrom for coupling with through holes in a trailer. The opposed angled side walls have a plurality of apertures therethrough in a spaced relationship. A plurality of pipe attachment portions are provided each having a generally triangular configuration. Each of the pipe attachment portions has a recess extending within a lower surface thereof. The recess is dimensioned for coupling with the narrow upper end and the angled side walls of the block portion. Each of the pipe attachment portions has an aperture extending through side walls thereof for aligning with the apertures through the block portion. A locking pin extends through the aligned apertures for securement of the pipe attachment portions to the block portion. A pipe harness is provided comprising a pair of elongated straps, a pair of short cross straps and criss-crossing central straps. The short cross straps have free ends with buckles disposed thereon. At least one extension strap is provided and is adapted for coupling with free ends of the elongated straps of the pipe harness. The extension strap has a clip on a free end thereof for engaging existing securement buckles on the trailer. At least one coupling strap is provided having clips disposed on opposing free ends thereof. The coupling strap couples with the buckles of the short cross straps and the existing securement buckles of the trailer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved cargo securing system which has all the advantages of the prior art cargo containment devices and none of the disadvantages.

It is another object of the present invention to provide a new and improved cargo securing system which may be easily and efficiently manufactured and marketed.

It is a further object of the present invention to provide a new and improved cargo securing system which is of durable and reliable construction.

An even further object of the present invention is to provide a new and improved cargo securing system which is susceptible of a low cost of manufacture with regard to both materials and labor, and which accordingly is then susceptible of low prices of sale to the consuming public, thereby making such a cargo securing system economically available to the buying public.

Even still another object of the present invention is to provide a new and improved cargo securing system for preventing Cargo from sliding while being transported on a trailer.

Lastly, it is an object of the present invention to provide a new and improved cargo securing system including at least one elongated block portion having a plurality of studs extending downwardly therefrom for coupling with through holes in a trailer. A plurality of pipe attachment portions are provided with each having a recess extending within a lower surface thereof. The recess is dimensioned for coupling with the block portion. A pipe harness is provided comprising a pair of elongated straps, a pair of short cross straps and criss-crossing central straps. The short cross straps have free ends with buckles disposed thereon. An extension strap is adapted for coupling with free ends of the elongated straps of the pipe harness. The extension strap has a clip on a free end thereof for engaging existing securement buckles on the trailer. A coupling strap is provided having clips disposed on opposing free ends thereof. The coupling strap couples with the buckles of the short cross straps and the existing securement buckles of the trailer.

These together with other objects of the invention, along with the various features of novelty which characterize the invention, are pointed out with-particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a plan view of the pipe harness of the present invention.

FIG. 5 is a plan view of the extension strap of the present invention.

FIG. 6 is a plan view of the coupling strap of the present invention.

The same reference numerals refer to the same parts through the various figures.

DESCRIPTION OF THE PREFERRED EMBODIMENT

Figure 1:
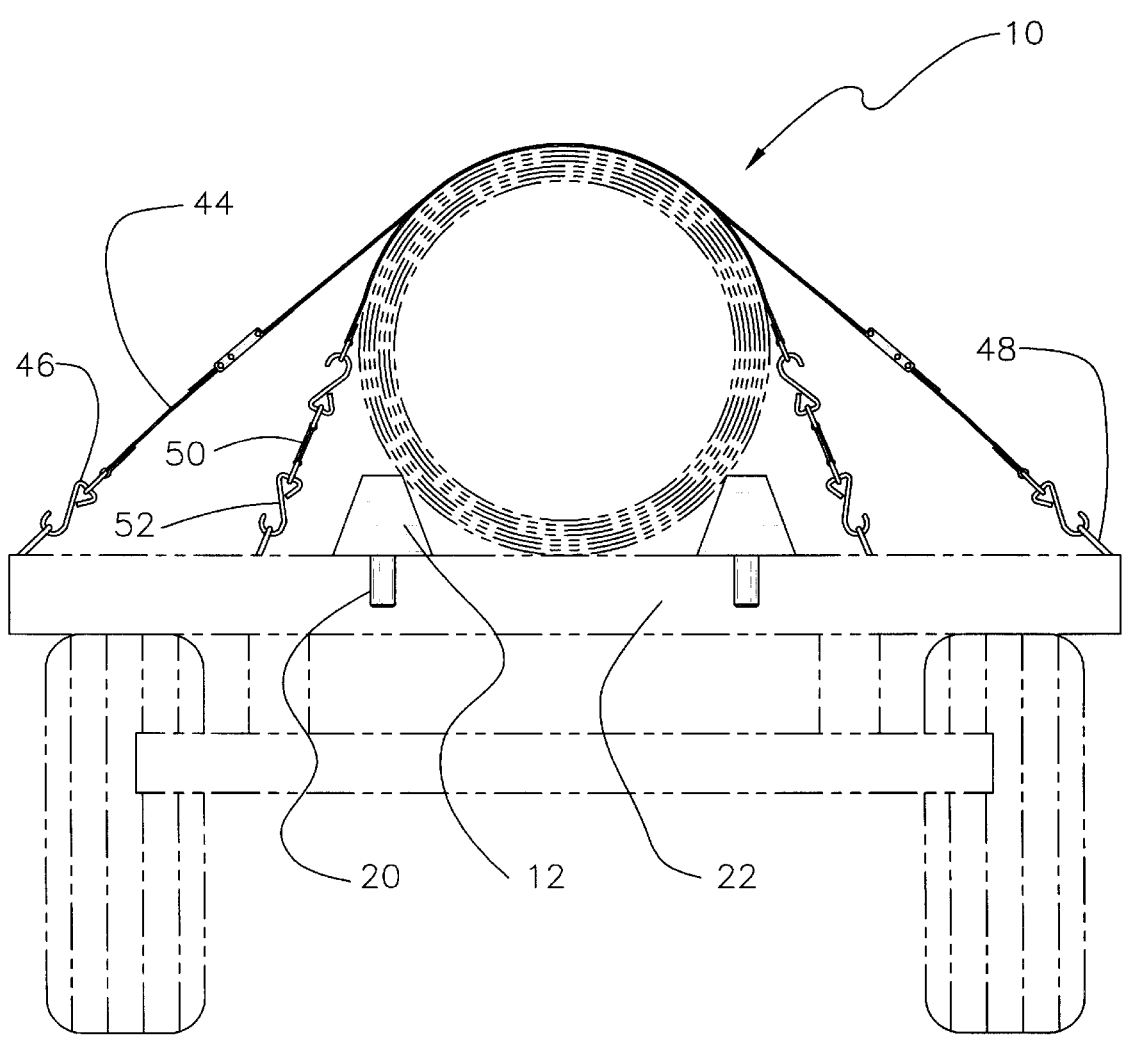
FIG. 1 is a perspective view of the preferred embodiment of the cargo securing system constructed in accordance with the principles of the present invention.
Figure 3:
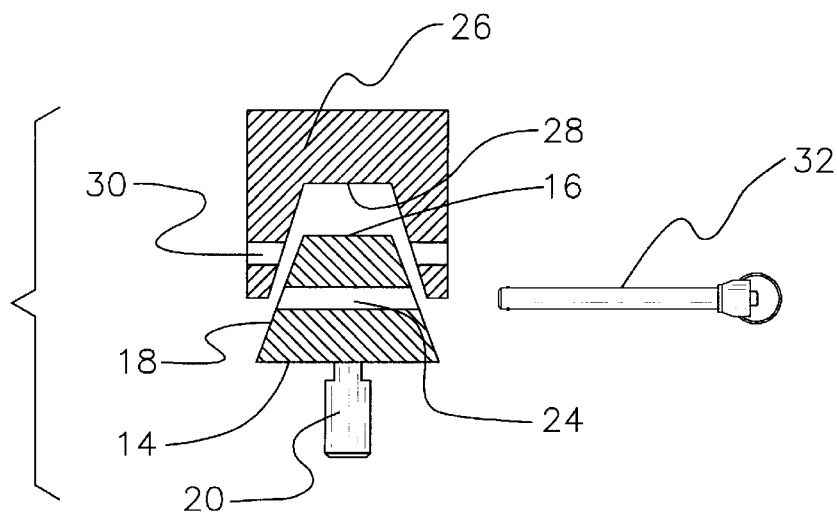
FIG. 3 is a cross-section front view of the present invention illustrated in FIG. 2 showing disengagement of the pipe attachment portion.
Figure 2:
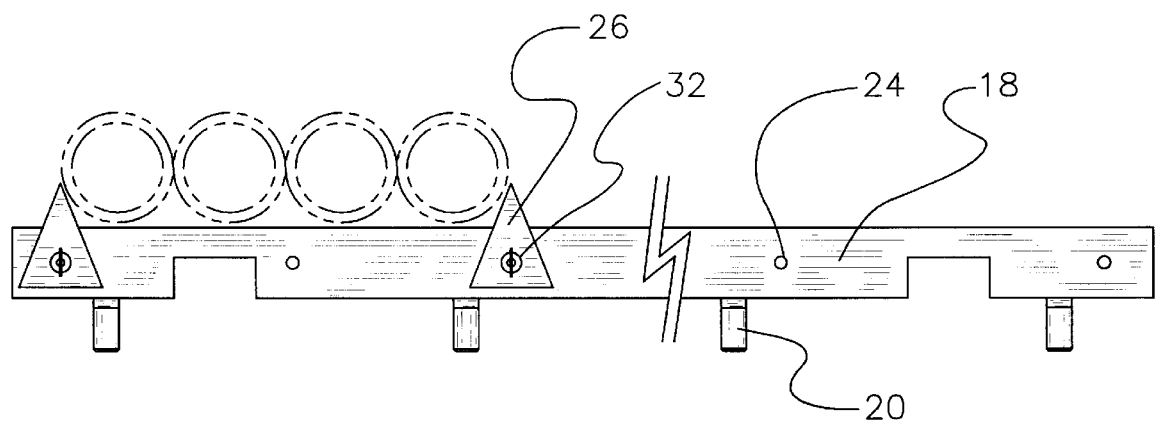
FIG. 2 is a side elevation view of the elongated block portion with pipe attachment portions in place.

With reference now to the drawings, and in particular, to FIGS. 1 through 6 thereof, the preferred embodiment of the new and improved cargo securing system embodying the principles and concepts of the present invention and generally designated by the reference number 10 will be described.

Specifically, it will be noted in the various Figures that the device relates to a cargo securing system for preventing Cargo from sliding while being transported on a trailer. In its broadest context, the device consists of an elongated block portion, a pipe attachment portion, a pipe harness, a coupling strap and an extension strap. Such components are individually configured and correlated with respect to each other so as to attain the desired objective.

The elongated block portion 12 has a trapezoidal cross-section. The block portion 12 has a wide lower end 14, a narrow upper end 16 and opposed angled side walls 18. The wide lower end 14 has a plurality of studs 20 extending downwardly therefrom for coupling with through holes in a trailer 22. The opposed angled side walls 18 have a plurality of apertures 24 therethrough in a spaced relationship. A pair of block portions 12 would be positioned on the trailer 22 in a longitudinal orientation for receiving large pipes or lumber therebetween. Note FIG. 1.

The plurality of pipe attachment portions 26 each have a generally triangular configuration. Each of the pipe attachment portions 26 has a recess 28 extending within a lower surface thereof. The recess 28 is dimensioned for coupling with the narrow upper end 16 and the angled side walls 18 of the block portion 12. Each of the pipe attachment portions 26 has an aperture 30 extending through side walls thereof for aligning with the apertures 24 through the block portion 12. A locking pin 32 extends through the aligned apertures 24,30 for securement of the pipe attachment portions 26 to the block portion 12. Note FIG. 3. The pipe attachment portions 26 will be put in place when the block portion 12 is orientated latitudinally on the trailer 22. This will allow for small pipes and small bundles to lay across the trailer 22. Note FIG. 2.

The pipe harness 34 is comprised of a pair of elongated straps 36, a pair of short cross straps 38 and criss-crossing central straps 40. The short cross straps 38 have free ends with buckles 42 disposed thereon. The pipe harness 34, in use, is draped over the pipe or load being carried. Note FIGS. 1 and 4.

The extension strap 44 is adapted for coupling with free ends of the elongated straps 36 of the pipe harness 34. The extension strap 44 has a clip 46 on a free end thereof for engaging existing securement buckles 48 on the trailer 22.

The coupling strap 50 has clips 52 disposed on opposing free ends thereof. The coupling strap 50 couples with the buckles 42 of the short cross straps 38 and the existing securement buckles 48 of the trailer 22.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A cargo securing system for preventing cargo from sliding while being transported on a trailer comprising, in combination:

at least one elongated block portion having a trapezoidal cross-section, the block portion having a wide lower end, a narrow upper end and opposed angled side walls, the wide lower end having a plurality of studs extending downwardly therefrom for coupling with through holes in a trailer, the opposed angled side walls having a plurality of apertures therethrough in a spaced relationship;

a plurality of pipe attachment portions each having a generally triangular configuration, each of the pipe attachment portions having a recess extending within a lower surface thereof, the recess dimensioned for coupling with the narrow upper end and the angled side walls of the block portion, each of the pipe attachment portions having an aperture extending through side walls thereof for aligning with the apertures through the block portion, a locking pin extending through the aligned apertures for securement of the pipe attachment portions to the block portion;

a pipe harness comprising a pair of elongated straps, a pair of short cross straps and criss-crossing central straps, the short cross straps having free ends with buckles disposed thereon;

at least one extension strap adapted for coupling with free ends of the elongated straps of the pipe harness, the extension strap having a clip on a free end thereof for engaging existing securement buckles on the trailer; and at least one coupling strap having clips disposed on opposing free ends thereof, the coupling strap coupling with a respective one of the buckles of the short cross straps and a respective one of the existing securement buckles of the trailer.

2. A cargo securing system for preventing cargo from sliding while being transported on a trailer comprising, in combination:

at least one elongated block portion having a plurality of studs extending downwardly therefrom for coupling with through holes in a trailer;

a plurality of pipe attachment portions having a recess extending within a lower surface thereof, the recess dimensioned for coupling with the block portion;

a pipe harness comprising a pair of elongated straps, a pair of short cross straps and criss-crossing central straps, the short cross straps having free ends with buckles disposed thereon;

at least one extension strap adapted for coupling with free ends of the elongated straps of the pipe harness, the extension strap having a clip on a free end thereof for engaging existing securement buckles on the trailer; and at least one coupling strap having clips disposed on opposing free ends thereof, the coupling strap coupling with a respective one of the buckles of the short cross straps a respective one of and the existing securement buckles of the trailer.

3. The cargo securing system as set forth in claim 2 wherein opposed side walls of the block portion have a plurality of apertures therethrough in a spaced relationship for communication with apertures through the pipe attachment portions for receiving a locking pin.

\* \* \* \* \*